US012151455B2

United States Patent
Nummila-Pakarinen et al.

(10) Patent No.: US 12,151,455 B2
(45) Date of Patent: Nov. 26, 2024

(54) MULTILAYER STRUCTURE

(71) Applicant: BOREALIS AG, Vienna (AT)

(72) Inventors: Auli Nummila-Pakarinen, Porvoo (FI); Stefan Ortner, Linz (AT); Peter Niedersuess, Linz (AT); Josefien Swagten-Linssen, Roosteren (NL)

(73) Assignee: BOREALIS AG, Vienna (AT)

( * ) Notice: Subject to any disclaimer, the term of this patent is extended or adjusted under 35 U.S.C. 154(b) by 252 days.

(21) Appl. No.: 17/611,833

(22) PCT Filed: May 15, 2020

(86) PCT No.: PCT/EP2020/063569
§ 371 (c)(1),
(2) Date: Nov. 16, 2021

(87) PCT Pub. No.: WO2020/234135
PCT Pub. Date: Nov. 26, 2020

(65) Prior Publication Data
US 2022/0234337 A1 Jul. 28, 2022

(30) Foreign Application Priority Data
May 17, 2019 (EP) ..................... 19175230

(51) Int. Cl.
*B32B 27/08* (2006.01)
*B29C 48/00* (2019.01)
*B29C 48/21* (2019.01)
*B32B 7/035* (2019.01)
*B32B 27/32* (2006.01)
*B65D 65/40* (2006.01)
*B29K 23/00* (2006.01)

(52) U.S. Cl.
CPC .......... *B32B 27/08* (2013.01); *B29C 48/0018* (2019.02); *B29C 48/21* (2019.02); *B32B 7/035* (2019.01); *B32B 27/32* (2013.01); *B65D 65/40* (2013.01); *B29K 2023/12* (2013.01); *B29K 2995/0053* (2013.01); *B32B 2250/242* (2013.01); *B32B 2307/306* (2013.01); *B32B 2307/516* (2013.01); *B32B 2307/518* (2013.01); *B32B 2307/54* (2013.01); *B32B 2307/5825* (2013.01); *B32B 2439/70* (2013.01); *B32B 2439/80* (2013.01); *B32B 2553/00* (2013.01)

(58) Field of Classification Search
None
See application file for complete search history.

(56) References Cited

U.S. PATENT DOCUMENTS

| 2003/0186039 | A1* | 10/2003 | Hanada | B32B 27/32 428/304.4 |
|---|---|---|---|---|
| 2007/0215610 | A1 | 9/2007 | Su et al. | |
| 2011/0052929 | A1 | 3/2011 | Nairn et al. | |
| 2018/0016414 | A1* | 1/2018 | Pehlert | C08J 9/04 |

FOREIGN PATENT DOCUMENTS

WO     2017002033 A1    1/2017

OTHER PUBLICATIONS

International Application No. PCT/EP2020/063569, "International Search Report", mailed Jul. 16, 2020, 2 pages.

* cited by examiner

*Primary Examiner* — Ramsey Zacharia
(74) *Attorney, Agent, or Firm* — COZEN O'CONNOR

(57) ABSTRACT

The present invention is directed to a multilayer structure. More specifically, the present invention is directed to a polypropylene multilayer extrusion laminate structure which provides sufficient thermal resistance and mechanical properties, and which multilayer structure can be recycled. The present invention is further directed to a process for producing the multilayer structure by an extrusion lamination process.

14 Claims, No Drawings

MULTILAYER STRUCTURE

This application is a national stage of PCT/EP2020/063569, filed on May 15, 2020, which claims priority to E.P. App. No. 19175230.2, filed on May 17, 2019, the entirety of which is incorporated herein by reference.

FIELD OF THE INVENTION

The present invention is directed to a multilayer structure. More specifically, the present invention is directed to a multilayer structure which provides sufficient thermal resistance and mechanical properties, and which multilayer structure can be recycled. The present invention is further directed to a process for producing the multilayer structure by an extrusion lamination process.

BACKGROUND

Flexible packaging is a very resource efficient way of product protection achieved by combining different materials in the layers of the multilayer structures, like in multilayer films. However, these types of multimaterial multilayer structures, like PET/PE or PET/PP combinations are a challenge for circular economy. Recycling, both mechanical and chemical recycling are very demanding or impossible due to poor quality of the recyclate.

Multilayer structures are prepared in different ways depending on the desired properties and demands of the end product and materials used in the preparation of the multilayer material.

In an extrusion coating process a thin film of molten polymer is extruded through a flat die and pressed onto or into a substrate. As substrates are commonly used paper, paperboard, fabrics, metal foils, plastic films or also another a polymer layer.

In a lamination process two or more substrate layers are bonded together using a layer between the substrate layer.

In an adhesive lamination method an adhesive layer is needed to bond two or more substrate layers together. Such an adhesive layer act as a glue between the substrate layers.

In an extrusion lamination process the molten polymer is extrusion laminated between two substrates, whereby the polymer acts as an adhesive between the layers. The substrates may be polymeric materials, paper, paperboard, fabrics or metal foils.

Multilayer structures are used in several type of applications. Multilayer film materials are typically used in packaging applications. Depending on the end application area the material has to fulfil desired criteria of e.g. mechanical, optical and/or sealing properties. Further, in some applications e.g. heat resistance is of utmost important, not to forget acceptable processing behaviour.

Problem to be Solved

Multilayer structures are commonly a combination of different materials in order to achieve desired end product properties and processability. Even if the multilayer structure comprises only polymer layers, the layers are typically of different type of polymers, or the layers may be blends of different polymeric materials. Further, multilayer materials produced by adhesive lamination comprise a separate adhesive glue being non-compatible and different to any of polymer material used in the layers.

However, as recycling is coming more and more important, multilayer materials composed of two or more different materials, including or consisting of polymer layers of different polymers or polymer blends of limited compatibility, like for example a combination of polar and non-polar polymers, are demanding in the recycling processes. I.e. such structures are not desired, or not even suitable in recycling point of view, although mechanical, sealing and other properties might be on a good level.

Therefore, there is a need to find solutions to produce multilayer structures being prepared of only one type of polymer or compatible polymers, and still resulting in the product having desired properties. I.e. there is a need to find a solution for producing a monomaterial multilayer structure fulfilling the desired properties, PE/PE laminates are easily recyclable, but they do not have sufficient thermal resistance required for example for hot filling or pasteurisation. Thus, there is a need for development of monomaterial solutions having said desired properties.

Polypropylene (PP) is a well-known commercial polymer used for a variety of products, such as packaging films and moulded shapes. Commercial propylene polymers exhibit several desirable properties, such as good heat tolerance and transparency, which make such propylene polymers attractive in many applications. However, such polymers often suffer from poor mechanical properties. E.g. bi-oriented PP (BOPP) film has high stiffness and good optical properties. BOPP films are widely used as print substrates due to good printing properties in flexible packaging. However, other mechanical properties like puncture and tear strength are low. Non-oriented PP films, either blown or cast films have much better mechanical properties.

Due to the variety of the properties of propylene polymers a multilayer material prepared only from polypropylene compositions would be an attractive solution for many applications.

Adhesive lamination is a common way to combine two or more substrates, which may be of polymer layers. A good adhesion is required, whereby an adhesive material is used as an adhesive layer between the substrate layers. Thus, adhesive lamination method would be a solution to prepare multilayer laminate of different propylene polymer films layers, e.g. combining BOPP film with a non-oriented cast or blown PP film. It would be expected that said combination would result in a desired end product with good mechanical properties in addition to the other well known properties, like heat resistivity.

However, it has been seen, that adhesion lamination results in deterioration of the mechanical properties of the final multilayer structure. A film layer included in the structure with poor mechanical properties, like a BOPP film, has a high negative influence on the mechanical properties of final adhesive laminate. I.e. even if the adhesive laminate contains as the other substrate layer a film with good mechanical properties, these properties are deteriorated by the influence of the layer without said properties (e.g. a BOPP layer). Therefore, polypropylene monomaterial multilayer adhesive laminated structure is not suitable in applications, where good mechanical properties are needed.

Further, the adhesive component, i.e. adhesive glue, is not a PP material, and is non-compatible with polypropylenes. Thus, such an adhesive PP laminate contains a non-compatible component, which deteriorates the recycling possibilities of such products.

Thus, there is a need to find a PP monomaterial multilayer structure having all desired good properties of the used PP films without suffering from deterioration of mechanical properties. Further, such a structure should be fully recyclable, i.e. to fulfil the requirement of circular solutions. Further, a method to prepare such products is to be provided.

Object of the Invention

An object of the invention is therefore to provide a polypropylene monomaterial multilayer structure, i.e. a polypropylene monomaterial multilayer laminate having improved balance of mechanical properties, having sufficient thermal resistance, and being of high quality material for recycling.

Further, the object of the invention is to provide a method for producing a polypropylene monomaterial multilayer laminate.

Still further, the object of the invention is to provide the polypropylene monomaterial multilayer laminate for use in packaging applications, especially in temperature resistant packaging material for food and/or medical products.

SUMMARY OF THE INVENTION

It has now been discovered, that the problems and deficiencies regarding problems with mechanical properties and recycling of the multilayer laminates, and especially of polypropylene multilayer adhesive laminates according to the state of the art can be avoided or at least significantly decreased by providing a polypropylene multilayer laminate prepared by extrusion lamination according to the present invention. It has been found that a polypropylene monomaterial multilayer extrusion laminate of the present invention, which laminate comprises a first external layer A) of polypropylene composition and a second external layer B) of polypropylene composition, and a polypropylene layer C) located between the first external layer A) and the second external layer B) meet the objectives.

As seen from one aspect of the invention the present invention provides a monomaterial multilayer structure comprising
  i) a first external layer A) comprising at least one film layer A-1) of polypropylene composition oriented in at least machine direction;
  ii) a second external layer B) comprising at least one film layer B-1) of non-oriented polypropylene composition
  iii) a core layer C) comprising at least one film layer C-1) of a branched polypropylene, between the first external layer A) and the second external layer B),
and wherein all additional optional film layers of the multilayer structure are of polypropylene composition.

As seen from another aspect of the invention the present invention provides a monomaterial multilayer extrusion laminate structure comprising
  i) a first external layer A) comprising at least one film layer A-1) of polypropylene composition oriented in at least machine direction;
  ii) a second external layer B) comprising at least one film layer B-1) of polypropylene composition
  iii) a core layer C) comprising at least one film layer C-1) of a branched polypropylene, located between the first external layer A) and the second external layer B), wherein the core layer C) is extrusion laminated between the external layers A) and B),
and wherein all additional optional film layers of the multilayer structure are of polypropylene composition.

As seen from still another aspect, the present invention provides a process for producing a multilayer structure as defined above, said process comprising the steps:

(I) providing a first external layer A) comprising at least one film layer A-1) of polypropylene composition oriented in at least machine direction;
(II) providing a second external layer B) comprising at least one film layer B-1) of non-oriented polypropylene composition;
(III) providing a core layer C) comprising at least one layer C-1) of a branched polypropylene; and
(IV) extrusion laminating the first external layer A), the second external layer B) with the core layer C) together to produce the multilayer laminate structure, and wherein all additional optional film layers of layers A), B) and C) are of polypropylene composition.

Further, the object of the present invention is to provide the polypropylene monomaterial multilayer structure for use as packaging material, in particular as a temperature resistant packaging material for food and/or medical products.

DETAILED DESCRIPTION OF THE INVENTION

Definitions

Polypropylene composition is defined in the present application to be a composition of polypropylene homopolymer or polypropylene copolymer with ethylene and/or with an α-olefin comonomer of 4 to 10 C atoms. α-olefin comonomer is preferably of 4 to 6 C atoms. Propylene copolymers are thus polypropylene random copolymers, polypropylene heterophasic copolymers or polypropylene terpolymers with ethylene and/or α-olefin comonomers of 4 to 10 C atoms. The composition optionally contains at most 15 wt-%, preferably at most 10 wt-%, of a plastomer of ethylene with C6-C10 α-olefin copolymer, and/or a polyethylene blended with the polypropylene homo- or copolymer.

The expression homopolymer used in the instant invention relates to a polypropylene that consists substantially, i.e. of at least 97 wt%, preferably of at least 99 wt%, and most preferably of at least 99.8 wt% of propylene units. In a preferred embodiment only propylene units in the polypropylene homopolymer are detectable.

In polypropylene copolymers the major part of the monomers is propylene i.e. at least 50% of the monomers is propylene. Polypropylene copolymers are non-polar.

Layers A) and B) may contain one or more polypropylene film layers, e.g. 1 to 7 film layers, where all polypropylene film layers are of polypropylene composition as herein defined.

The core layer C) comprises at least one film layer of branched polypropylene. The core layer may also comprise one or more additional polypropylene film layers as herein defined. Branched polypropylene for a film layer of the core layer C) is defined in detail below.

The External Layers A) and B)

The external polypropylene film layers may be selected from bi-oriented PP films (BOPP film), (oriented in Machine (MD) and Transfer Direction (TD)), mono-oriented (MD) PP films, and from non-oriented PP films.

If layers A) and B) are of multilayer film structures, they are co-extruded to form the multilayer external film layers.

The External Layer A)

The external layer A) is selected from mono-oriented PP films, i.e. oriented in at least machine direction, and bi-oriented PP films (BOPP film), (oriented in Machine (MD)

and Transfer Direction (TD)). The external layer A) comprises at least one layer of A-1) of at least machine oriented film.

In a preferred embodiment layer A) is a BOPP film. BOPP films are preferably used, when e.g. good printing surface is desired. BOPP films have high gloss and clarity, and are high in stiffness. However, other mechanical properties like puncture and tear strength are low.

Layer A) may comprise one or more oriented film layers, e.g. 1 to 7 film layers, preferably 1 to 5 film layers of polypropylene composition. In a preferred embodiment layer A) comprises at least one bi-oriented PP (BOPP) film layer, most preferably 1 to 3 BOPP film layers. Polypropylene of the BOPP film is polypropylene composition of polypropylene homopolymer or polypropylene copolymer. According to one preferred embodiment the BOPP film is a polypropylene copolymer with ethylene and C4 to C10 comonomer, preferably ethylene and C4 to C6 comonomer. Comonomer content is in the range of 1 to 20 wt-%, preferably in the range of 2 to 15 wt-%. Melt flow rate ($MFR_2$) measured with ISO1133 (230° C., 2.16 kg load) is preferably 2 to 10 g/10 min, and melt temperature Tm is in the range of 120 to 150° C.

If more than one film layer is included in layer A) they are coextruded together to form a the external layer A). Polypropylenes of Layer A) are typically not blended with a plastomer.

Thickness of layer A) is preferably in the range of 5 to 100 μm, more preferably 10 to 60 μm, especially in the range of 15 to 40 μm, and still more preferably in the range of 15 to 30 μm, like 15 to 25 μm. Commercial BOPP films have typically the thickness of 20 μm.

External Layer B)

In order to provide a multilayer monomaterial film structure with sufficient mechanical properties said oriented PP layer A) is combined with a non-oriented polypropylene layer in the multilayer structure of the present invention. Such non-oriented films are typically of blown or cast films.

Cast and blown PP films are of polypropylene homopolymers or polypropylene co- or terpolymers as defined above. The comonomer is ethylene and/or one or more α-olefins of 4 to 10 C atoms, preferably ethylene and/or one or more α-olefins of 4 to 6 C atoms. According to one preferred embodiment the polypropylene copolymers used in the layer B) are heterophasic polypropylenes. Heterophasic polypropylenes contain a polymer matrix, which is polypropylene homoplymer or polypropylene random copolymer. In case the polypropylene matrix is a polypropylene copolymer, then it is preferred that the comonomer is ethylene or butene. However, also other α-olefin comonomers known in the art are suitable. The preferred amount of comonomer, more preferably ethylene, in the polypropylene matrix is up to 8.00 mol %. In case the polypropylene copolymer matrix has butene as the comonomer component, it is in particular preferred that the amount of butene in the matrix is up to 6.00 mol %. Preferably, the ethylene-propylene rubber (EPR) in the total polypropylene copolymer is up to 60 wt % more preferably, the amount of ethylene-propylene rubber (EPR) in the total polypropylene copolymer is in the range of 15 to 60 wt %, still more preferably in the range of 20 to 50 wt %.

The polypropylene composition may contain a small amount of a plastomer, i.e. at most 15 wt-%, preferably at most 10 wt-% of plastomer, blended with the polypropylene composition. A small amount polyethylene may in addition or alternatively be blended with the polypropylene. Preferably, the plastomer is an ethylene-octene copolymer. Plastomers are described in detail below.

External layer B) may comprise one or more film layers, e.g. 1 to 7 film layers, preferably 1 to 5 polypropylene film layers, which film layers may be of the similar or different polypropylene compositions as herein defined. One or more film layers of the external layer B) may be a composition of polypropylene blend with a plastomer and/or polyethylene as herein defined, preferably plastomer.

The film thickness of the external layer B) is in the range of 40 to 200 μm, preferably in the range of 50 to 150 μm, more preferably in the range of 50 to 120 μm, and still more preferably in the range of 60 to 100 μm.

If more than one film layer is included in layer B) they are coextruded together to form the external layer B).

Suitable polypropylenes are produced by means within the skill in the art, for example, using single site catalysts or Ziegler Natta catalysts. The propylene and optionally ethylene and/or alpha-olefins are (co)polymerized under polymerisation conditions in one or more olefin polymerisation stages within the skill in the art.

In addition to the polymers as defined above the polypropylene compositions of the polymer layers may also comprise, and preferably comprise, additives, such as antioxidants, process stabilisers, antiblock agents, lubricants, acid scavengers, pigments and the like.

The production of mono- or bi-oriented, and non-oriented films (blown or cast film), is generally known in the art.

Layer C)

The core layer C) comprises at least one film layer C-1) of branched polypropylene. The branched polypropylene used in the present invention is characterized with a high melt strength and is commonly called as HMS polypropylene (HMS-PP). The high melt strength polypropylene (HMS-PP) is prepared as known in the art by chemical modification. The branched polypropylenes as herein defined are suitable to be used in extrusion coating and extrusion lamination process.

Suitable branched polypropylene used in the present invention in the film layer C-1) is a propylene copolymer. Preferably, said branched polypropylene has a melt flow rate ($MFR_2$, 230° C. and 2.16 kg load, ISO 1133) in the range of 10 to 16 g/10 min, preferably in the range of 12 to 14 g/10 min and a melting temperature in the range of 160 to 164° C. (ISO11357-3). Further, a crystallization temperature (DSC) of the branched polypropylene is in the range of 122 to 126° C. (ISO11357-3) and a Vicat softening temperature A (10N) in the range of 146-150° C. (ISO306). The branched polypropylene does not contain any intentionally added nucleating agents.

Suitable commercial branched polypropylenes used in the present invention are among others WF420HMS and SF313HMS.

Thus, the mandatory film layer in the extrusion laminate of the present invention is a polypropylene layer C) comprising at least one film layer C-1) of branched polypropylene as defined above.

Use of branched polypropylenes as defined above as a film layer C-I) in the extrusion laminate of the present invention results in a multilayer structure with good mechanical properties and balance of said properties. I.e. it does not only prevent the negative influence of an external layer with poor mechanical properties on the final multilayer structure, but has also positive influence on many mechanical properties. Thus, the film layer C-1) suits well to be used in extrusion lamination as a single layer (monolayer) with an even coating weight in the core layer C).

As indicated above the core layer C) may comprise more than one film layers C-1). Layer C) may also comprise additional film layers, like barrier layers etc., provided, that all additional film layers are of polypropylene composition as herein defined.

The polypropylene to be modified to obtain branched polypropylene may be a polypropylene homopolymer or a polypropylene copolymer. Polypropylene copolymer is a polypropylene random copolymer or heterophasic copolymer, i.e. a polypropylene copolymer comprising a polypropylene matrix and an ethylene-propylene rubber (EPR).

Plastomers

Suitable plastomers optionally blended with polypropylenes used in the multilayer extrusion laminated structure of the present invention are ethylene based plastomers with a density below 915 kg/m$^3$. The ethylene-based plastomers are low-density ethylene-copolymers comprising ethylene polymers with at least one-olefin comonomer. The comonomers are α-olefin comonomers of 4 to 10 C-atoms, provided that at least one co-monomer is a monomer with at least 6 C-atoms. I.e., if the plastomer is an ethylene terpolymer, then at least one monomer has 6 or more C-atoms. Preferably comonomers in plastomers of ethylene-copolymers are selected from α-olefins of 6 to 10 C-atoms, preferably 6 to 8 C atoms, and are more preferably copolymers of ethylene with one α-olefin of 6 to 8 C-atoms, especially ethylene-octene coplymers.

Suitable ethylene based plastomers have a density in the range of 860 to 915 kg/m$^3$, preferably in the range of 870 to 912 kg/m$^3$, more preferably 885 to 910 kg/m$^3$, and in some embodiments from 890 to 905 kg/m$^3$. MFR$_2$ (190° C./2.16 kg) of the plastomer is in the range of 0.01 to 25 g/10 min, preferably in the range of 0.05 to 20 g/10 min, more preferably in the range of 1 to 15 g/10 min, and in some embodiments in the range of 1 to 10 g/10 min.

The melting points (measured with DSC according to ISO 11357-3: 1999) of suitable ethylene based plastomers are below 130° C., preferably below 120° C., more preferably below 110° C. and most preferably below 100° C. Furthermore suitable ethylene based plastomers have a glass transition temperature Tg (measured with DMTA according to ISO 6721-7) of below −25° C., preferably below −30° C., more preferably below −35° C. In case the plastomer is a copolymer of ethylene and a C4-C10 alpha olefin it has an ethylene content from 60 to 95 wt %, preferably from 65 to 90 wt % and more preferably from 70 to 88 wt %.

Suitable ethylene based plastomers can be any copolymer of ethylene and propylene or ethylene and C4-C10 alpha olefin having the above defined properties, which are commercial available, i.a. from Borealis under the tradename Queo, from Dow Chemical Corp (USA) under the tradename Engage or Affinity, or from Mitsui under the tradename Tafmer.

Alternately these ethylene based plastomers can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the persons skilled in the art.

Preferably these ethylene based plastomers are prepared by a one stage or two stage solution polymerization process, especially by high temperature solution polymerization process at temperatures higher than 100° C., preferably at least 110°, more preferably at least 150° C. The polymerization temperature can be up to 250° C.

Such process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

The pressure in such a solution polymerization process is preferably in a range of 10 to 100 bar, preferably 15 to 100 bar and more preferably 20 to 100 bar.

The liquid hydrocarbon solvent used is preferably a C5-12-hydrocarbon which may be unsubstituted or substituted by C1-4 alkyl group such as pentane, methyl pentane, hexane, heptane, octane, cyclohexane, methylcyclohexane and hydrogenated naphtha. More preferably unsubstituted C6-10-hydrocarbon solvents are used. Such processes are disclosed, among others, in WO-A-1997/036942, WO-A-2006/083515, WO-A-2008/082511, and WO-A-2009/080710.

Plastomers used in the present invention are preferably produced in a solution process in the presence of metallocene catalyst.

Polymer Blends

Any blend (e.g. a blend of polypropylene and a plastomer, polyethylene and additives) optionally used in the above-described layers can be produced by any suitable melt mixing process at temperatures above the melting point of the respective blend.

In this application "blend" or "blending" means that the different components (i.e. polypropylene and plastomer) are combined by mechanical blending, like melt or dry blending. Plastomers, as herein defined, and polypropylene are compatible with each other, and are thus suitable to be used as a blend in the present invention. The individual components are prepared separately in different processes.

The amount of the optional plastomer in the polypropylene composition of any of the layers of the multilayer structure of the present invention is below 15 wt-%, preferably at most 10 wt-%, which amount is still allowable to be included in a polypropylene monomaterial multilayer structure to be used as a recyclate.

In the final multilayer structure of the present invention, the amount of polypropylene polymers is at least 90 wt-%.

Typical devices for performing said melt mixing process are twin screw extruders, single screw extruders optionally combined with static mixers, chamber kneaders like Farrel kneaders, Banbury type mixers and reciprocating co-kneaders like Buss co-kneaders. Preferably, the melt mixing process is carried out in a twin screw extruder with high intensity mixing segments.

It is also possible to produce the blend of the polypropylene and the plastomer by dry-blending in a suitable mixing equipment, like horizontal and vertical agitated chambers, tumbling vessels, and Turbula mixers, as long as sufficient homogeneity is obtained.

Optionally, additional additives such as fillers, slip agents, anti-block agents, antioxidants, chill roll release agents and polymer process aid can be incorporated into the melt blends and dry blends. Typically, the amount of additives is not more than 2% by weight, preferably not more than 1% by weight and especially preferably not more than 0.5% by weight.

Film Preparation
External Layers A) and B)

Oriented films are typically monoaxially or biaxially oriented films, whereas non-oriented films are cast or blown films. Accordingly, a non-oriented film is not drawn intensively in machine and/or transverse direction as done by oriented films. Thus, the non-oriented film according to this invention is not a monoaxially or biaxially oriented film. Preferably the non-oriented film according to the instant invention is a blown film or cast film.

The non-oriented external layers in accordance with the present invention may be prepared by any conventional film extrusion procedure known in the art, e.g. with blown film extrusion. Preferably, the non-oriented multilayer film structure is formed by blown film extrusion, more preferably by co-extrusion processes, which in principle are known and available to the skilled person.

Typical processes for preparing a multilayer film structures for layers in accordance with the present invention are extrusion processes through an annular die. A bubble is formed by blowing air inside the tube formed by the film, thereby cooling the film. The bubble is collapsed between the rollers after solidification. Conventional film production techniques may be used in this regard. Typically, the film layers of the external layers are coextruded in manner as known in the art. The blow up ratio can be in the range of from 1 (1:1) to 4 (1:4), preferably 1.5 (1:1.5) to 3.5 (1:3.5).

The film preparation process steps of the invention are known and may be carried out in one film line in a manner known in the art. Such film lines are commercially available, for example from Windmöller & Hölscher, Reifenhauser, Hosokawa Alpine, etc.

Typically, a three-layer structure is produced on a 3-layer co-extrusion line, but in some embodiments it may be appreciated that the used co-extruder is a 5 or 7 layer co-extrusion line, especially in case e.g. barrier or tie layers are to be co-extruded.

Blocked Film Structure

For the blocked film type structure the multilayer coextruded film exits the die in the form of a bubble, the bubble is cut, i.e. the formed bubble is collapsed e.g. at the nip rolls to form said film and then the two halves forced together to effectively form the multilayer structure. In this way, the film thickness is effectively doubled and the desired initial film thickness achieved. This is called film blocking in the art.

The film forming the first external layer A) layer is oriented at least in the machine direction according to the present invention.

The obtained monolayer or multilayer A) is subjected to a subsequent stretching step, wherein the film is stretched in the machine direction (MDO). Stretching may be carried out by any conventional technique using any conventional stretching devices which are well known to those skilled in the art.

The MDO process can be done in-line, wherein the MDO unit is directly linked to the blown film unit, i.e. the film leaving the blown film line is directly transferred in the MDO unit.

The MDO process can also be done off-line, wherein the MDO unit is an autonomous unit. In this case the film leaving the blown film line is first wound on a winder and is then supplied to the off-line MDO unit, where the film has to be un-wind on a un-winder unit before it can be stretched.

If blocked film structures are used, the MDO process is preferably done in-line.

During the MDO, the film obtained from the blown-film line is heated to an orientation temperature. Preferably, the temperature range for orientation can be 25° C. below the VICAT A-level of the (outer) film layer material up to the melting temperature of the (outer) film layer material. The heating is preferably performed utilizing multiple heating rollers.

Next, the heated film is fed into a slow drawing roll with a nip roller, which has the same rolling speed as the heating rollers. The film then enters a fast drawing roll. The fast drawing roll has a speed that is 2 to 10 times faster than the slow draw roll, which effectively orients the film on a continuous basis.

The oriented film then enters annealing thermal rollers, which allow stress relaxation by holding the film at an elevated temperature for a period of time.

The annealing temperature is preferably within the same temperature range as used for stretching or slightly below thereof (e.g. 10 to 20° C. below), with room temperature being the lower limit. Finally, the film is cooled through cooling rollers to an ambient temperature.

The ratio of the film thickness before and after orientation is called stretch ratio. The stretch ratio varies depending on many factors including the desired film thickness, film properties, and multilayer film structures.

The preparation process of the uniaxially oriented in MD monolayer or multilayer film useful in the invention comprises at least the steps of forming the monolayer or multilayer film and stretching the obtained monolayer or multilayer film in the machine direction in a draw ratio of of 1:1.5 to 1:12, preferably of 1:2.0 to 1:10, more preferably of 1:3.0 to 1:8.

The film is stretched 1.5 to 12 times up its original length in the machine direction. This is stated herein as a stretch ratio of 1:1.5 to 1:12, i.e. "1" represents the original length of the film and "1.5" or "12" denotes that it has been stretched to 1.5 or 12 times that original length.

An effect of stretching (or drawing) is that the thickness of the film is similarly reduced. Thus a stretch ratio of 1:1.5 or 1:12 typically also means that the thickness of the resulting film is from 1/1.5 to 1/12 of the original thickness.

After orientation, the film forming the first external layer A) has a film thickness of 5 to 100 µm, preferably 10 to 80 µm and more preferably 10 to 40 µm. This means that, for example, using a stretch ratio of 1:3 to yield a 0 µm film needs a primary film of 90 µm and using a stretch ratio of 1:12 to yield a 30 µm film needs a primary film of 360 µm.

Extrusion Lamination

According to present invention the polypropylene monomaterial multilayer structure is produced by extrusion lamination. The extrusion lamination process resembles the extrusion coating process, but in extrusion lamination the core layer is extruded between two substrates, i.e. between the external layers. Thereby, the external layers A) and B), as herein defined are provided as substrates to the extrusion lamination process. The core layer C), comprising a least one layer C-1) as herein defined is then extrusion laminated between the external layer A) and external layer B). As indicated in the present application, layers A) and B) comprise one or more film layers. The core layer C) may also comprise in addition to the film layer C-1) one or more layers. Such additional layers may, depending on the needs, be of further propylene polymer compositions as defined above.

The line speed in the extrusion lamination process is typically from 50 to 1000 m/min, preferably from 75 to 650 m/min, and especially from 100 to 500 m/min.

When the core layer C) comprising at least one film layer of the branched polypropylene have been extrusion laminated between the two external layers A) and B) the structure is passed to a nip formed by a chill roll and a pressure roll. The chill roll is typically water-cooled and has the objective of cooling the extruded structure to a suitable temperature. Typically, the surface temperature of the chill roll can be from about 15° C. to about 60° C. The temperature of the polymer melt is typically between 240 to 330° C., preferably from 250 to 315° C. Layers A) and B) may be subjected to pre-corona treatment and layer C) to ozone treatment.

The layer of the branched polypropylene has a basis weight of from 3 to 20 g/m$^2$, preferably from 5 to 15 g/m$^2$ and more preferably from 8 to 12 g/m$^2$. A too low basis weight may lead to insufficient adhesion. A too high basis weight has no major technical drawback but leads to an unnecessary high cost of the structure and may also make the core layer thicker than desired.

Benefits of the Invention

The polypropylene monomaterial multilayer extrusion laminates according to the present invention are recyclable and provide a structure having improved balance of mechanical properties. I.e. the extrusion laminate structure does not suffer from the deterioration of the mechanical properties, but most of the mechanical properties can be improved or at least maintained by producing the polypropylene monomaterial multilayer structure by extrusion lamination. This a clear benefit over the polypropylene monomaterial multilayer structure prepared by adhesion lamination.

Further, adhesives used in adhesive lamination are typically not propylene-based polymers and not compatible with the polypropylenes and this causes problems in recycling. Instead, the multilayer structure of the invention comprises only polypropylene compositions as herein defined, and is thus well suitable to recycling purposes.

The extrusion laminate provides a great variety of polypropylene monomaterial structures with improved balance of mechanical, thermal and optical properties.

In the following, the present invention is described by way of examples.

Description of Methods

Melt flow rate MFR$_2$—ISO1133 (230° C., 2.16 kg load) for polypropylene

Melt flow rate MFR$_2$—ISO1133 (190° C., 2.16 kg load) for polyethylene

Density—ISO1183

Melt temperature Tm (DSC)—ISO 3146

Tensile modulus in Machine (MD) and Transfer Direction (TD) machine direction was measured at room temperature according to ISO 527-3.

Tensile strength in Machine (MD) and Transfer Direction (TD) machine direction was measured at room temperature according to ISO 527-3.

Puncture Peak force N/mm was measured using a Dynatest—ISO7765-2,

Total penetration Energy J/mm was measured using a Dynatest—ISO7765-2,

Relative Elmendorf Tear strength MD/TD N/mm was measured according to ISO6383/2

EXAMPLES

The following materials were used in the following experimental tests:

Material a) a polypropylene heterophasic copolymer with MFR$_2$ of 1 g/10 min (230° C.)

Material b) Polyethylene plastomer with MFR$_2$ of 3 g/10 min (190° C.) and density of 882 kg/m$^3$ Material c) C3/C2/C4 Polypropylene terpolymer with MFR$_2$ of 3 g/10 min (230° C.)

Material d) polypropylene homopolymer with MFR$_2$ of 8 g/10 min (230° C.)

Material e) polypropylene heterophasic copolymer with MFR$_2$ of 3 g/10 min (230° C.)

Material f) HMS—branched polypropylene copolymer SF313HMS provided with MFR$_2$ of 13 g/10 min (230° C.), by Borealis BOPP—commercial available BOPP film Comparative Example 1—CE1

For comparison a three layer cast film of total 80 μm thickness with the following structure was prepared as disclosed in Table 1. Thicknesses of film Layers 1, 2 and 3 are given as of the total thickness of the three layer cast film.

TABLE 1

| Film structure CE1 | Thickness/% | Layer Material |
|---|---|---|
| Layer 1 | 20 | d) |
| Layer 2 | 60 | e) +10% b) |
| Layer 3 | 20 | c) +25% b) |

Comparative Example 2—CE2

For comparison a three layer blown film of total 80 μm thickness with the following structure was prepared as disclosed in Table 2. Thicknesses of film Layers 1, 2 and 3 are given as of the total thickness of the three layer blown film.

TABLE 2

| Film structure CE2 | Thickness/% | Layer Material |
|---|---|---|
| Layer 1 | 20 | a) |
| Layer 2 | 60 | a) +10% b) |
| Layer 3 | 20 | c) +10% b) |

Comparative Example 3—CE3

For comparison an adhesive laminate of a BOPP film of 20 μm with the three layer cast film of CE1 (80 μm) was prepared. As adhesive between the BOPP and cast film was used an adhesive glue.

TABLE 3

| Film structure CE3 | Thickness/μm | Layer Material |
|---|---|---|
| Layer 1 | 20 | BOPP |
| Layer 2 | ~2 | adhesive glue |
| Layer 3 | 80 | CE1 |

Inventive Example 1—IE1

The inventive multilayer film structure prepared by extrusion lamination is disclosed in Table 4. As BOPP film was used the same BOPP film as in CE3. As non-oriented layer was used the blown film of CE2. As core layer was used branched PP of material f).

TABLE 4

| Film structure CE2 | Thickness/μm | Layer Material |
|---|---|---|
| Layer 1 | 20 | BOPP |
| Layer 2 | 10 | f) |
| Layer 3 | 80 | CE2 |

Mechanical test results are disclosed in Table 5.

TABLE 5

|  | CE1 | CE2 | CE3 | IE1 |
|---|---|---|---|---|
| Puncture Peak Force (N) | 120 | 94 | 210 | 270 |
| Total Penetration Energy (J/mm) | 20 | 12 | 10 | 13 |
| Tensile Modulus MD (100 MPa) | 867 | 1070 | 1040 | 1214 |
| Tensile Strength MD (MPa) | 50 | 60 | 32 | 38 |
| Relative Elmendorf Tear strength MD N/mm | 19 | 5 | 9 | 9 |

Looking the results it can be seen, that in the Inventive extrusion laminate structure (IE1) the Puncture Peak Force, Total Penetration Energy, Relative Elmendorf Tear strength and Tensile Modulus are improved compared to the blown film layer (CE2). I.e. BOPP film does not have negative influence on these properties in the multilayer extrusion laminate structure comprising the branched polymer in the core layer of the laminate.

Further, it can be seen that in the adhesion laminate (CE3) only Tensile Modulus MD and Puncture Peak Force are improved, but Total Penetration Energy, Tensile Strength MD and Relative Elmendorf Tear strength are reduced compared to the cast film layer. I.e. BOPP film has negative influence on many mechanical properties of the multilayer adhesive laminate.

The invention claimed is:

1. A multilayer structure comprising
   i) a first external layer A) having a thickness ranging from 5 to 100 microns and comprising at least one film layer A-1) of polypropylene composition oriented in at least machine direction;
   ii) a second external layer B) comprising at least one film layer B-1) of non-oriented polypropylene composition
   iii) a core layer C) having a thickness and comprising at least one film layer C-1) of a branched polypropylene having a basis weight of from 3 to 20 g/m², between the first external layer A) and the second external layer B),
   wherein all additional optional film layers of the multilayer structure are of polypropylene composition, and
   wherein layer A) is a bi-oriented polypropylene film and layer B) is a non-oriented mono- or multi-layer cast film or blown film.

2. The multilayer structure of claim 1, wherein the film layer C-1) of a branched polypropylene has MFR$_2$ (230° C., 2.16 kg load) in the range of 10 to 13 g/10 min, and a melting temperature in the range of 160 to 164° C.

3. The multilayer structure of claim 1, wherein the second external layer B) is a multilayer film of at least 3 layers.

4. The multilayer structure according to claim 1, wherein the polypropylene composition of all film layers A or all film layers B or all additional film layers is of polypropylene homopolymer, polypropylene copolymer with ethylene or polypropylene copolymer with ethylene and/or with an α-olefin comonomer of 4 to 10 C atoms.

5. The multilayer structure of claim 1, wherein the polypropylene composition comprises polypropylene random copolymers or polypropylene heterophasic copolymers comprising a polymer matrix of polypropylene homopolymer or polypropylene copolymer with ethylene and/or α-olefin monomer of 4 to 4 C-atoms.

6. The multilayer structure according to claim 1, wherein the polypropylene composition of all film layers A or all film layers B or of all additional film layers is a blend of polypropylene with at most 15 wt-% of a plastomer of ethylene with C6-C10 α-olefin copolymer and/or with polyethylene.

7. The multilayer structure according to claim 1, wherein the amount of polypropylene polymer in the multilayer structure is at least 90 wt-% of the total amount of polymers in the multilayer structure.

8. A temperature resistant packaging material for food and/or medical products comprising the multilayer structure as defined in claim 1.

9. The multilayer structure of claim 1, wherein the thickness of the first external layer A) ranges from 15 to 40 μm.

10. A multilayer extrusion laminate structure comprising
   i) a first external layer A) having a thickness ranging from 5 to 100 microns and comprising at least one film layer A-1) of polypropylene composition oriented in at least machine direction;
   ii) a second external layer B) comprising at least one film layer B-1) of non-oriented polypropylene composition
   iii) a core layer C) having a thickness and comprising at least one film layer C-1) of a branched polypropylene having a basis weight of from 3 to 20 g/m², located between the first external layer A) and the second external layer B), wherein the core layer C) is extrusion laminated between the external layers A) and B),
   wherein all additional optional film layers of the multilayer structure are of polypropylene composition, and
   wherein layer A) is a bi-oriented polypropylene film and layer B) is a non-oriented mono- or multi-layer cast film or blown film.

11. A process for producing a multilayer structure as defined in claim 10, said process comprising the steps:
   (I) providing a first external layer A) comprising at least one film layer A-1) of polypropylene composition oriented in at least machine direction;
   (II) providing a second external layer B) comprising at least one film layer B-1) of polypropylene composition;
   (III) providing a core layer C) comprising at least one layer C-1) of a branched polypropylene; and
   (IV) extrusion laminating the first external layer A), the second external layer B) with the core layer C) together to produce the multilayer laminate structure, and wherein all additional film layers of A), B) and C) are of polypropylene composition.

12. The process according to claim 11, wherein any of layers A), B) or C) is a multilayer film.

13. The process according to claim 12, wherein the multilayer film is produced by coextrusion.

14. The multilayer structure of claim 10, wherein the thickness of the first external layer A) ranges from 15 to 40 μm.

* * * * *